(12) United States Patent
Faber et al.

(10) Patent No.: US 7,882,992 B2
(45) Date of Patent: Feb. 8, 2011

(54) CELLULAR WHEEL SLUICE

(75) Inventors: Harald Faber, Viernheim (DE); Klaus Kohlmueller, Worpswede (DE); Robert Weinand, Darmstadt (DE)

(73) Assignee: Schenck Process GmbH, Darmstadt (DE)

( * ) Notice: Subject to any disclaimer, the term of this patent is extended or adjusted under 35 U.S.C. 154(b) by 500 days.

(21) Appl. No.: 10/586,297

(22) PCT Filed: Jan. 11, 2005

(86) PCT No.: PCT/EP2005/000181

§ 371 (c)(1),
(2), (4) Date: Jul. 13, 2006

(87) PCT Pub. No.: WO2005/068910

PCT Pub. Date: Jul. 28, 2005

(65) Prior Publication Data

US 2007/0151995 A1    Jul. 5, 2007

(30) Foreign Application Priority Data

Jan. 13, 2004  (DE) .................. 10 2004 001 965

(51) Int. Cl.
*A01C 15/04* (2006.01)

(52) U.S. Cl. .................. 222/636; 222/370; 222/345; 406/67

(58) Field of Classification Search .................. 222/636, 222/368, 367, 369, 370, 345; 406/63, 65, 406/67
See application file for complete search history.

(56) References Cited

U.S. PATENT DOCUMENTS

| | | | | |
|---|---|---|---|---|
| 2,903,302 A | * | 9/1959 | Ross .................. | 406/67 |
| 3,708,890 A | * | 1/1973 | Weisselberg .................. | 222/368 |
| 3,913,800 A | * | 10/1975 | Logan .................. | 222/368 |
| 4,155,486 A | * | 5/1979 | Brown .................. | 222/368 |
| 4,231,495 A | * | 11/1980 | Lund .................. | 222/368 |

(Continued)

FOREIGN PATENT DOCUMENTS

DE          0 562 287          10/1932

(Continued)

OTHER PUBLICATIONS

Translation of Patent No. EP0505707 to Motan Verfahrenstechnik; Published Sep. 30, 1992; 13 Pages.*

*Primary Examiner*—Kevin P Shaver
*Assistant Examiner*—Jonathan Wood
(74) *Attorney, Agent, or Firm*—W. F. Fasse; W. G. Fasse

(57) ABSTRACT

A cellular wheel sluice embodied as a blow-through sluice is suitable for dosing secondary fuel, for example. The blow-through sluice includes a supply chute (2) in the top area and a cylindrical housing (1) which is disposed below the supply chute (2) and in which a cellular wheel (4) is arranged. The cellular wheel (4) includes radial webs (3), in the rotational area of which a blow-in hole (10) and an opposite blow-out hole (11) are provided on the side faces (26) of the housing. An injector nozzle (15) which blows the transport air into the rotating dosing chambers (5) so as to empty the same, is integrated into the housing in the area, of the blow-in hole (10). Thereby pressure differences result in the dosing chamber (5) that is to be emptied such that only small pressure loads act upon the metallically hard gap seals, which have a long useful life and allow only small quantities of leakage air, and which are arranged on the radial end areas of the cellular wheel webs (3).

20 Claims, 2 Drawing Sheets

U.S. PATENT DOCUMENTS

| | | | | |
|---|---|---|---|---|
| 4,268,205 A * | 5/1981 | Vacca et al. | | 222/368 |
| 4,411,390 A * | 10/1983 | Woten | | 241/98 |
| 4,610,399 A | 9/1986 | Weichenrieder | | |
| 4,823,993 A * | 4/1989 | Siegel et al. | | 222/345 |
| 4,844,101 A * | 7/1989 | Hirsch et al. | | 131/296 |
| 4,906,144 A * | 3/1990 | Matsueda | | 222/368 |
| 4,978,252 A * | 12/1990 | Sperber | | 406/64 |
| 5,114,053 A | 5/1992 | Beirle | | |
| 5,299,888 A * | 4/1994 | Wysong et al. | | 406/67 |
| 5,324,143 A * | 6/1994 | Sanders | | 406/67 |
| 5,341,966 A * | 8/1994 | Blankmeiser et al. | | 222/370 |
| 5,368,311 A * | 11/1994 | Heyl | | 222/368 |
| 5,725,332 A * | 3/1998 | Harper et al. | | 406/67 |
| 5,829,649 A * | 11/1998 | Horton | | 222/636 |
| 6,109,488 A * | 8/2000 | Horton | | 222/636 |
| 7,419,358 B2 * | 9/2008 | Heep | | 222/368 |
| 2003/0231933 A1 | 12/2003 | Prough | | |

FOREIGN PATENT DOCUMENTS

| | | |
|---|---|---|
| DE | 34 01 774 | 8/1985 |
| DE | 40 04 415 | 12/1990 |
| DE | 200 06 800 | 7/2000 |
| DE | 199 01 967 | 8/2000 |
| DE | 201 08 844 | 1/2002 |
| DE | 101 17 187 | 6/2002 |
| DE | 101 19 306 | 10/2002 |
| EP | 0 505 707 | 9/1992 |
| EP | 1 110 885 | 6/2001 |

* cited by examiner

CELLULAR WHEEL SLUICE

The invention relates to a cellular wheel sluice, for example for dosing secondary fuels.

BACKGROUND INFORMATION

Recycling products are used more and more for producing heat in industrial production methods. Particularly so-called secondary fuels are used for the production of cement and other ceramic products. These secondary fuels are used along with primary fuels such as coal dust and the like. The secondary fuels include dust type fuels, granulated fuels, pelletized fuels, flaked fuels and fiber secondary fuels, all of which are used in rotary kilns. These secondary fuels are produced of recycled garbage or waste materials which are shredded and sorted in accordance with material groups and then are delivered for use. The materials involved are for example, shredded plastic materials, paint dusts, carpet floor fibers, animal meal and other fuels made of garbage or of production scrap materials. In a few kilns operating in the cement industry already more than half of the fuel requirements are added as secondary fuels. These fuels gain more and more importance since the costs are small. The secondary fuels are generally supplied through dosing equipment into pneumatic transport conduits to be supplied into the combustion process. Cellular wheel sluices have proved themselves in practice for feeding into the pneumatic transport conduits. These sluices make possible a volumetric dosing under a pneumatic seal of the fuel supply.

German Patent Publication DE 200 06 800 U1 discloses such a fuel dosing with a cellular wheel sluice. A blow-through cellular wheel sluice is provided for the fuel dosing whereby the cellular wheel sluice axis extends in the direction of the main feed stream. A blower is arranged upstream of the cellular wheel sluice. The blower blows the secondary fuels out of the cellular wheel sluice into the transport conduit to the kiln. In connection with such blow-through cellular wheel sluices the problem occurs often that the blown-in air which is under a certain pressure of the air production reaches, as the cellular wheel keeps rotating, the point of material feeding as so-called scooping air where it exits directed opposite to the material flow which hinders the material flow. Simultaneously leakage air flows are generated through the gaps between the cellular wheel webs and the cellular wheel housing walls. These leakage air flows simultaneously blow back portions of the material through the gaps into the feeding chute. This makes a fuel dosing apparatus with such a blow-through cellular wheel sluice frequently ineffective and inaccurate because due to this reason it may come to a pulsating charging and thus to variations in the dosing precision. In this connection it also frequently happens that the dosing chambers are not completely emptied. In order to prevent this, more air is blown into the cellular wheel chamber whereby the reaction in the furnace is disturbed and may become ineffective.

For preventing such a scooping air and leaking air proportion, German Patent Publication DE 101 17 187 C1 discloses a cellular wheel sluice for secondary fuel dosing which is also constructed as a blow-through cellular wheel sluice. Thereby a cellular wheel having a relatively large inner core is provided by which the trapeze-shaped dosing chambers are formed only in the outer area of the radially extending webs. These dosing chambers are connected with an inlet pipe and an outlet pipe having a cross-section corresponding approximately to the size of the dosing chamber. Thereby, particularly the outlet opening is widened compared to the inlet opening, particularly for reducing the scooping air proportion so that the inlet opening is already closed as the cellular wheel keeps rotating while the outlet opening still has an opening gap in the widened areas. This feature is intended to cause a reduced pressure which sucks an air proportion out of the dosing chamber while the inlet opening is closed so that the scooping air proportion is reduced. Simultaneously, the cellular wheel sluice has sealing lips toward the housing at the ends of the dosing webs. These sealing lips are intended to close the leakage air gap so that a more continuous dosing and an improved chamber emptying is achievable by reducing the leakage air proportion. Such sealing lips which contact the housing are made as a rule of soft rubber-type sealing materials which seal the gap but nevertheless do not damage the housing walls nor do they cause wear and tear. However, secondary fuel materials frequently contain abrasive dust components, fiber remainders or metallic wire or nail remainders which damage the sealing lips making their functional life relatively short, thereby requiring frequent maintenance work.

SUMMARY OF THE INVENTION

It is thus the object of the invention to further develop a cellular wheel sluice particularly for a secondary fuel dosing of the type described above in such a manner that it provides a high dosing accuracy while simultaneously having long working lives for the cellular wheel sluice to thereby be less trouble prone.

This object has been achieved by the invention as disclosed and defined herein.

The invention has the advantage that due to the integrated injector nozzle at the inlet of the blowout chamber a relatively high blow-in velocity becomes effective in this chamber which assures a complete emptying of the chamber and which causes only a small pressure loading at the cellular wheel gaps. Thereby the leaking air proportion along the dosing chamber, the content of which can be blown out, is reduced up to 70% so that, again advantageously, a precise and uniform dosing of the most varied secondary fuels is possible. The small pressure loading at the cellular wheel gaps of the blow-through chamber makes it possible simultaneously to use wear and tear resistant metallic so-called hard web seals which assure particularly in connection with the most varied and even abrasive secondary fuels advantageously very high working lives of the components subject to wear and tear. Thereby simultaneously cellular shearing wheel web edges are possible. These shearing web edges advantageously prevent a plugging up and a wear and tear of the cellular wheel sluice along the rotating cellular wheel chamber gaps and thereby assure a trouble-free operation.

Further, the invention has the advantage that due to the integrated injector nozzle the transport conduit cross-sections are substantially independent of the dosing chamber volume because due to the higher blow-in velocity even dosing chambers having a large volume can be completely emptied without having to put up with a noticeable leakage air. Thus, it is advantageously possible that practically any prepared burnable garbage can be dosed by the same cellular wheel sluice without the need to adapt the feed advance pipe cross-sections or the blow-out power. Thus, simultaneously high counter-pressures can be tolerated without the need to use softer gap seals so that while maintaining the dosing accuracy uniform, hard, wear and tear resistant gap seal materials can be advantageously used.

Due to the use of the integrated injector nozzle it is possible to advantageously feed high filling degrees of at least 30% in the dosing chambers, to the furnace whereby an effective air-fuel ratio can be maintained, which leads to an environmentally friendly combustion substantially free of residues.

The invention has further the advantage that due to the possibility of using hard or wear-resistant metallic gap seals a high-temperature constancy is achievable which in turn assures a high safety against flame flashback and pressure surge.

BRIEF DESCRIPTION OF THE DRAWINGS

The invention will be explained in more detail with reference to an example embodiment that is shown in the drawings. The drawings show.

DETAILED DESCRIPTION OF EXAMPLE EMBODIMENTS OF THE INVENTION

Figure 1:
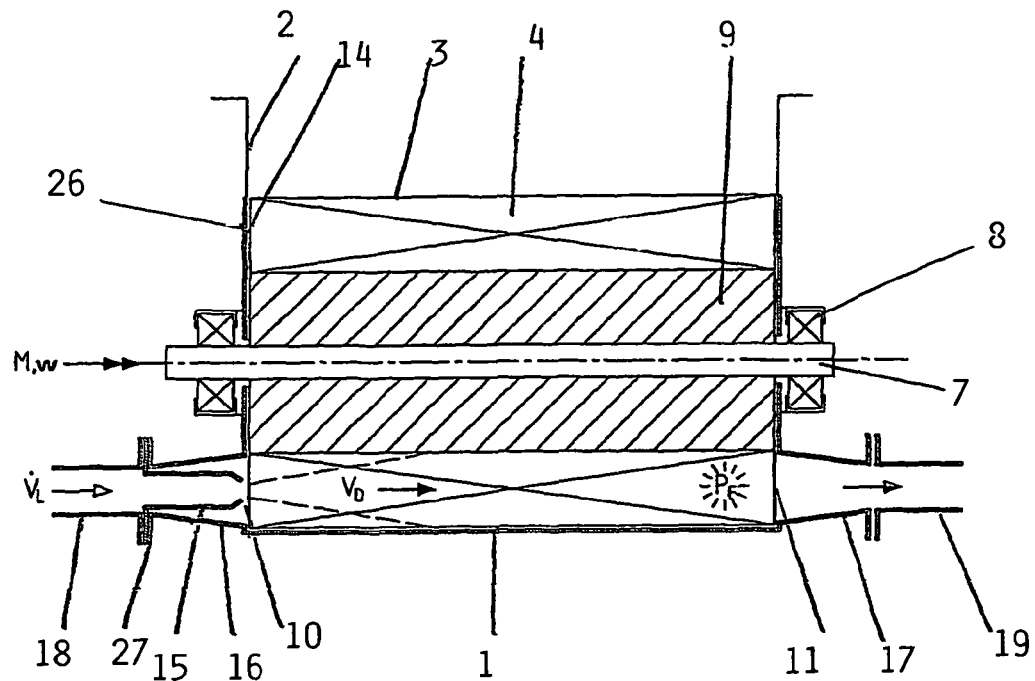
FIG. 1 a schematic sectional illustration of a side view through the axial central plane of a cellular wheel sluice.

A cellular wheel sluice for secondary fuel dosing is schematically shown in FIG. 1 of the drawing. The sluice is constructed as a blow-through sluice with hard gap seals 12 and which comprises an injector nozzle 15 integrated into the blow-in opening 10 of the blower conduit 18.

The cellular wheel sluice comprises a cylindrically-shaped housing section 1 on which an upwardly open supply chute 2 is arranged. The supplied secondary fuels are fed into the supply chute 2 for the dosing. These secondary fuels may be fed from a silo or a dosing belt scale into the supply chute 2 by gravity. These days, garbage or production scrap remnants are used as secondary fuels which have been prepared and which are combustible. These materials are processed to form film or fiber shreds or pellets having an edge length of about 10 to 50 mm and contain even still smaller granular or dust-type components.

Furthermore, production remnants such as clean dust and granular remnants made of animal meal, animal feeds, wood chopping chips, old wood chips and sawdust are usable as secondary fuel. These are supplied as bulk materials having a bulk material density of about 50 to 500 kg/m$^3$ whereby secondary fuels of animal meal and animal feed remnants may have densities of up to 800 kg/m$^3$. Such secondary fuels are partly rather abrasive and contain partially hard, undesirable components such as small rocks, wire or screw remnants which can cause a high wear and tear of the cellular wheel sluice parts with which they come into contact. Thus, high operational lifetimes are required of all components subject to wear and tear in order to assure an undisturbed and precise dosing operation.

The above mentioned secondary fuels to be dosed are blown with the aid of a pneumatic transport conduit 19 into a kiln positioned downstream. In order to assure an optimal combustion and not too large combustion remnants, a loading of 2.5-4 kg of secondary fuel per kilogram of air is provided, whereby it becomes possible to achieve advantageously a degree of filling in the dosing chambers 5 of about 30%.

Figure 2:
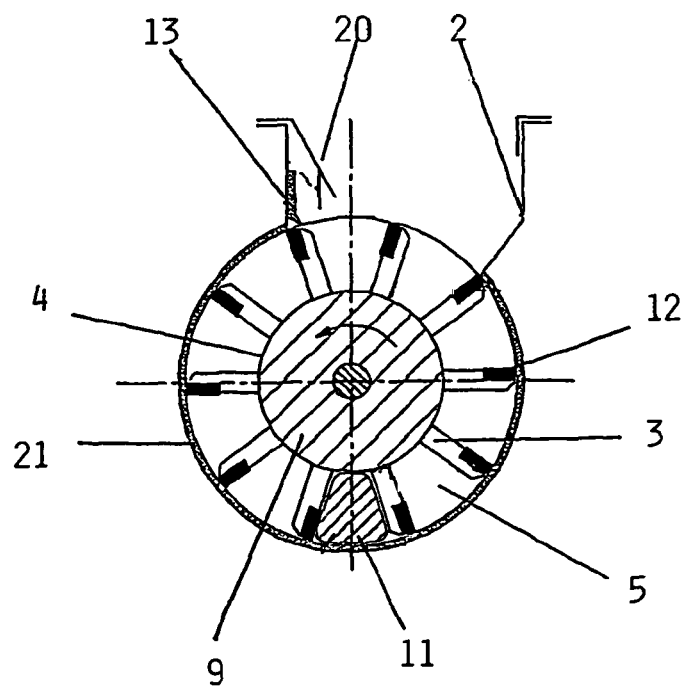
FIG. 2 a schematic sectional illustration of the front view through the cross-central plane of a cellular wheel sluice.

The illustrated cellular wheel sluice is dimensioned for a feed capability of about 3 tons/hour whereby the supply chute 2 has a length of about 800 mm and a width of about 450 mm. A cellular wheel 4 is arranged in the cylindrical housing section 1 below the supply chute 2 axially in the feed advance direction. The wheel 4 comprises ten radially extending cell wheel webs 3. The cell wheel webs 3 can extend in the axial direction linearly or slanted or they may have a light helical configuration. FIG. 2 of the drawings shows that the cellular wheel webs 3 form ten circumferentially distributed dosing chambers 5. The secondary fuels are fed with the help of these dosing chambers from the supply chute 2 into the feeding pipe 19.

The cellular wheel 4 comprises a central drive shaft 7 which is supported in a low-friction manner in two ball bearings 8 in the housing facing surfaces 26. A tubular core 9 is arranged surrounding the drive shaft 7 of the cellular wheel 4. The cell wheel webs 3 are secured to the core 9 thereby forming trapezoidally-shaped dosing chambers 5. The cellular wheel is preferably about 800 mm long and has an outer diameter of about 600 mm. Two openings 10 and 11 axially positioned opposite one another are arranged below the drive shaft 7 and the rotational area of the cellular wheel 2 at the two facing walls 26 of the housing for connection to the feed advance pipe 19 or a blower. The blow-in opening 10 is positioned on the left side or rather on the blower side. A blow-out opening 11 is positioned on the right side, or rather on the furnace side. The openings have a cross-section corresponding approximately to the dosing chamber cross-section. The blow-in opening 10 is connected with a blow-in pipe socket 16 which has a trapezoidal shape toward the housing facing walls 26 and a round shape toward the blower connecting pipe 18. The socket 16 has a connecting flange 27. The blow-in pipe socket 16 is connected to a blower (not shown) through the blower connector pipe 18. The blower blows the pneumatic transport means into the dosing chamber 5 that needs to be cleaned out by blowing into the cellular wheel sluice.

Figure 3:
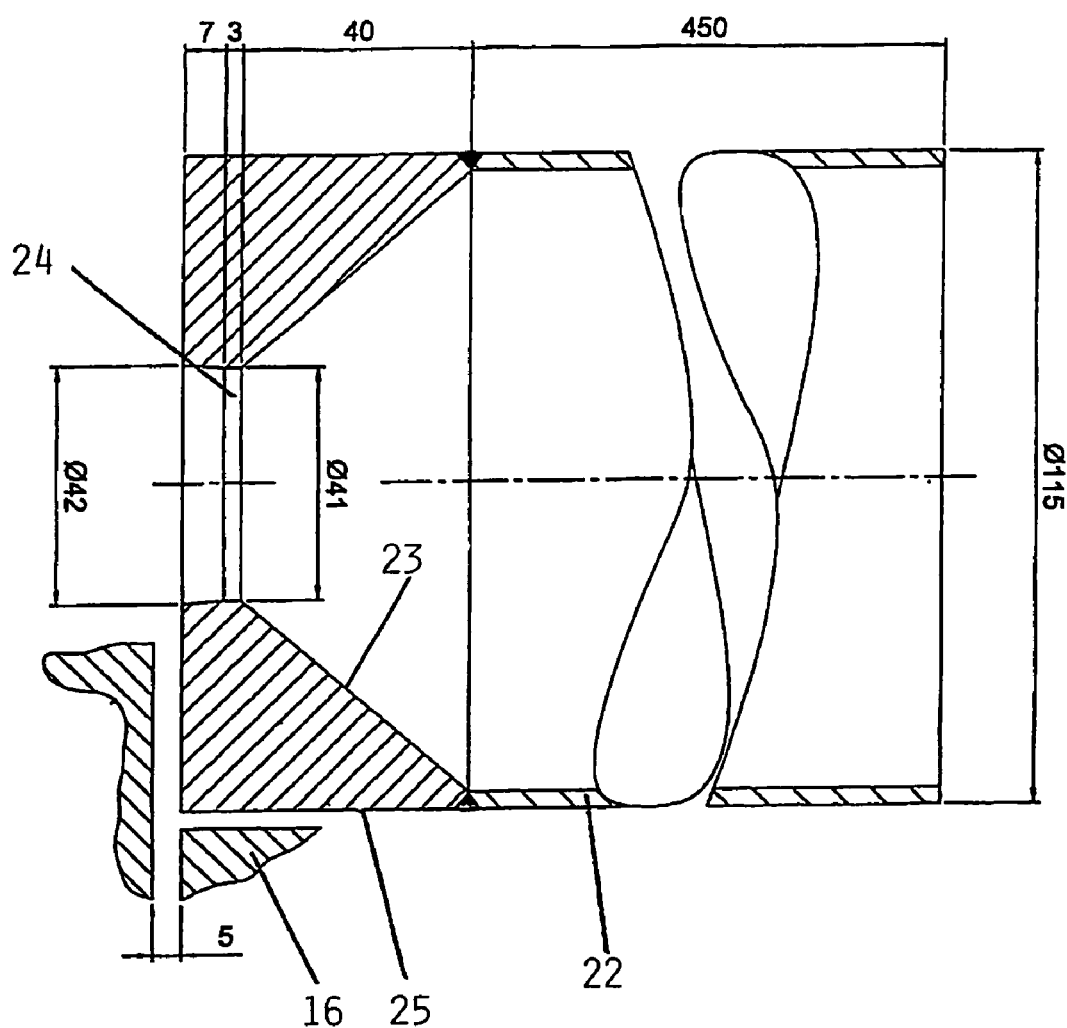
FIG. 3 a sectional view through the front portion of an injector nozzle.

An injector nozzle 15 is integrated into the blow-in pipe socket 16. The injector nozzle 15 is clamped in an air-tight manner between the mounting flange 27 of the blow-in pipe socket 16 and the blower connector pipe 18. The injector nozzle 15 is shown with its blow-in side front section in a sectional view in FIG. 3 of the drawing in more detail. In this connection the injector nozzle 15 comprises substantially a cylindrical pipe 22 which includes at its air exit side a cone-shaped tapering 23 and in its center a circular nozzle opening 24. In the projected example embodiment the nozzle pipe 22 comprises preferably a clearance of 109 mm and is arranged coaxially relative to the blow-in pipe socket 16. Preferably the nozzle pipe 22 reaches with its nozzle opening 24 into the blow-in opening 10. A cylinder-shaped guide rim 25 is arranged around the nozzle opening 24 for a better guiding. This guide rim 25 bears at least partially against the inner wall of the blow-in pipe socket 16. The nozzle opening 24 has a clearance of preferably 41 mm and widens to a clearance of preferably 42 mm toward the exit edge in order to reduce any air turbulences at the exit edge. The blow-in opening 10 is preferably constructed to have a trapezoidal shape. However, the blow-in opening 10 may also have smaller round opening cross-sections due to the injector nozzle 15.

The blow-out opening 11 is arranged axially opposite the blow-in opening 10 at the other facing surface of the cellular wheel sluice and preferably also constructed to have a trapezoidal shape. In this connection the blow-out opening 11 has a cross-section which corresponds to the cross-section of the dosing chamber 5 to assure a good emptying of the rotating dosing chambers 5. A blow-out pipe socket 17 is also secured to the facing surface of the housing at the blow-out opening 11 on the side of the transport pipe. This socket 17 provides the connection to the feed advance pipe 19 through which the blown-out secondary fuels are transported to the kiln.

For operating the blow-through sluice the latter is driven by an electric motor not shown at an RPM of about 20 revolutions per minute whereby the supplied secondary fuels are transported to the blow-out opening 11 with a predetermined feed advance volume of three tons per hour. For this purpose, advantageously an outlet cross-section is selected as large as possible so that the outlet cross-section corresponds as much as possible to the cross-section of the dosing chamber 5. A predetermined counter-pressure of about 400 mbar shall not be exceeded at the outlet cross-section. At a higher counter-pressure the loading at the web sealings, and thus the leakage air volume, would be relatively large so that particularly the easily volatile fuel components could again return in to the supply chute 2. This, however, would lead to an unprecise dosing operation and would increase the wear and tear on the sealing locations as well as of the intermediate spaces.

In order to keep the wear low, the cellular wheel sluice is designed with a special wear concept which increases the useful life of the wear-prone components to at least one year. Therefore, the cellular wheel webs 3 are constructed in their radially outer end or edge areas as shear-cutting edges 12, and a counter-cutting edge 13 is arranged in the supply chute 2 to cooperate with the shear-cutting edges 12 for shear-cutting any secondary fuel particles that come between the counter-cutting edge 13 and the shear-cutting edges 12. For this purpose, the shear-cutting edges 12 are oriented with the cutting edges thereof facing forward in the rotation direction of the cellular wheel 4, and the counter-cutting edge 13 is oriented opposed to the shear-cutting edges 12, namely with its cutting edge facing opposite the rotation direction of the cellular wheel 4. By such shear-cutting of the secondary fuel particles, the secondary fuel particles are prevented from entering into the gap between the housing sections 1, 26 and the cellular wheel 4. For this purpose there is additionally provided a preliminary scraper 20 in the supply chute 2. The preliminary scraper guides the secondary fuel particles away from the sealing gaps into the dosing chamber 5. Additionally, the cutting edges 12 are constructed as separate wear resistant edges, which are made of stainless knife steel or other wear resistant steel alloys, and which are exchangeably secured to the radially outer end areas of the base members of the cellular wheel webs 3.

Such a wear lining 14 is also provided on the inner surfaces of the housing facing sides 26 which are intended to there prevent an increase of the gap widths by abrasive bulk material particles. Advantageously, the inner surfaces of the cylindrically-shaped housing section 1 is also lined with a wear bushing 21 made of spring steel or other abrasion-resistant steel alloys which additionally increase the useful life. In this connection, small gap widths for sealing are necessary between the wear bushing 21 and the cutting edges 12 of the cellular wheel webs 3 as well as at the facing surfaces 26. The gap widths for sealing are about 0.2 to 0.5 mm in order to avoid a contact with the rotating cellular wheel 4 and thus also prevent a high friction or even damage at the inner housing walls. Due to these small gaps leakage air proportions that may enter into the supply chute are basically unavoidable. Particularly, these leakage air proportions can press easily volatile secondary fuels through the gaps and cause such eddy currents that a continuous dosing is impaired. Heretofore, this was mostly prevented by additional and special gap seals or by sucking of leakage air.

Therefore, the invention suggests an integrated injector nozzle 15 for a low wear and tear cellular wheel sluice. The nozzle opening 24 is aligned with the facing side of the blow-in opening 10. Since the nozzle opening 24 causes a cross-sectional reduction an increase of the air velocity occurs in the blow-in opening 10 just as an increase in the blower capacity would. This air velocity increase takes care of a quick clearing particularly at the dosing chamber inlet. However, due to the cross-sectional increase within the dosing chamber 5 with advantageous dimensions a continuous reduction of the air velocity takes place in the blow-out direction which achieves the original blower air velocity approximately when reaching the dosing chamber center. Due to these pressure differences in the first half of the dosing chamber reduced pressure zones occur at the dosing chamber gaps which prevent an exit of leakage air and simultaneously draw the secondary fuels present in the dosing chamber 5 into the blow-out airstream. Thereby, the predetermined counter-pressure builds up only toward the dosing chamber exit so that only a noticeable leakage air proportion can become effective at the dosing chamber end.

Due to such a reduction of the leakage air proportion up to 70% it becomes, surprisingly, possible not to use a wear and tear prone soft seal made of well sealing rubber-type materials, even without thereby impairing the dosing accuracy. Simultaneously, only a relatively small blower capacity is required due to the reduction of the leakage air proportion even though a pressure drop of 0.2 to 0.3 bar occurs at the injector nozzle 15. Thereby it is simultaneously assured that the dosing chamber 5 is completely blown empty reliably and completely at a predetermined fuel proportion of 2 to 4 kg/kg air.

Due to the small leakage air losses dosing of secondary fuels having differing bulk material densities per volume becomes possible thereby using the same cellular wheel sluice because compensation can be made for different densities by adapting the nozzle cross-section in a simple manner. For the same reason, large volume cellular wheel sluices can be constructed which then merely require relatively small cross-sections in the transport conduits because even high counter-pressures cause only relatively small leakage air quantities. Blow-through sluices with transport capacities of about 1 to at least 15 tons/hour can be constructed for dosing such secondary fuels. These sluices have constant chamber and transport pipe cross-sections and can feed almost all prevailing secondary fuels into pneumatic transport conduits 19 in a durable and well-dosed manner with little wear and tear.

In a further embodiment of the cellular wheel sluice it is provided to construct the cellular wheel webs 3, provided with cutting edges 12, to be slanted in the axial direction or to have a slight helical configuration so that already when an overflow occurs at the blow-in opening 10, the blow-out opening 11 still remains effectively open for blowing out. With this feature a uniform shearing free of jerks of the secondary fuels is achieved at the straight counter-cutting blade 13. When the cutting edges 12 or the cellular wheel webs 3 are axially straight, it is also possible to position the counter-cutting blade 13 with a slant in the axial direction in order to assure a uniform shearing without jerking.

Furthermore, the invention is not limited to the illustrated example embodiments but can also be put to use through constructive developments of comparable embodiments. In this connection a use for primary fuels is also contemplated which are pre-treated the same as the above mentioned secondary fuels. These primary fuels do not come from garbage or other production scraps. Such a cellular wheel sluice can also be used for performing a pneumatic transportation of pre-sorted or pre-treated garbage even if such transport is provided outside a thermal use.

The invention claimed is:

1. An axial blow-through cellular wheel feeder for feeding particulate bulk solid material, comprising:
    a housing that comprises a cylindrical wall extending concentrically about a horizontal axis, and planar vertical side walls at axial ends of said cylindrical wall, wherein said cylindrical wall and said side walls bound a cylindrical space in said housing;
    a bulk solid material supply chute that is adapted to feed the particulate bulk solid material and that communicates into said cylindrical space in said housing through a supply opening in said cylindrical wall;
    a cellular wheel that comprises plural cellular wheel webs extending radially outwardly from a central wheel hub that is supported rotatably about said horizontal axis in said cylindrical space in said housing, and respective gap seals arranged respectively at radially outer edges of said cellular wheel webs, wherein respective dosing chambers are respectively formed and bounded radially between said central wheel hub and said cylindrical wall and circumferentially between respective successive neighboring pairs of said cellular wheel webs, wherein said gap seals are made of a hard material that has a hardness equal to that of a metal, wherein said gap seals are arranged to leave a radial spacing gap between each one of said gap seals and said cylindrical wall, and wherein respective radially outer edges of said gap seals are configured as respective shear-cutting edges that are oriented facing circumferentially forward in a rotation direction of said cellular wheel about said horizontal axis;
    a counter-cutting member with a counter-cutting edge arranged in said supply chute adjacent to said supply opening at a chute-bounding side wall of said supply chute that is circumferentially downstream with respect to said rotation direction of said cellular wheel about said horizontal axis, wherein said counter-cutting edge is positioned relative to said shear-cutting edges and oriented circumferentially opposite said shear-cutting edges so as to cooperate with said shear-cutting edges to shear-cut particles of the particulate bulk solid material between said counter-cutting edge and said shear-cutting edges;
    a blow-in hole that is provided below said horizontal axis in a first one of said vertical side walls;
    a blow-out hole that is provided below said horizontal axis and axially across from said blow-in hole in a second one of said vertical side walls; and
    an injector nozzle that is mounted to said housing at said blow-in hole and that has an internal nozzle passage that converges to a throat and diverges from said throat to a nozzle outlet opening at an end of said injector nozzle arranged at said blow-in hole, wherein said injector nozzle is positioned and adapted to blow a stream of transport gas into and through a respective one of said dosing chambers in communication with said blow-in hole, and out through said blow-out hole in a blowing transport direction parallel to said horizontal axis so as to be adapted to cause a reduced pressure of the transport gas around said blow-in hole in said respective dosing chamber and thereby reduce an amount of leakage of said transport gas through said radial spacing gaps past said gap seals, and to transport the particulate bulk solid material with the transport gas out of said respective dosing chamber through said blow-out hole in said transport direction.

2. The blow-through cellular wheel feeder according to claim 1, wherein said radial spacing gap has a radial measure from 0.2 mm to 0.5 mm.

3. The blow-through cellular wheel feeder according to claim 1, wherein each one of said dosing chambers has a substantially trapezoidal, annular sector cross-sectional shape, and said blow-out hole has a substantially trapezoidal, annular sector opening shape.

4. The blow-through cellular wheel feeder according to claim 3, wherein said opening shape of said blow-out hole has an area that approximately corresponds to an area of said cross-sectional shape of a respective one of said dosing chambers.

5. The blow-through cellular wheel feeder according to claim 1, further comprising a deflector scraper protruding from said chute-bounding side wall into said supply chute above said counter-cutting member so as to be adapted to deflect away from said counter-cutting member the particulate bulk solid material fed through said supply chute.

6. The blow-through cellular wheel feeder according to claim 1, further comprising a cylindrical wear layer on an inner surface of said cylindrical wall and a respective planar wear layer on respective inner surfaces of said vertical side walls of said housing, wherein said wear layers are composed of a wear resistant steel alloy or a spring steel.

7. The blow-through cellular wheel feeder according to claim 1, wherein said cellular wheel webs and said gap seals have a helical shape about said horizontal axis.

8. The blow-through cellular wheel feeder according to claim 1, wherein said cellular wheel webs and said gap seals each respectively extend at a circumferentially skewed slant relative to said horizontal axis.

9. A cellular wheel sluice constructed as an axial blow-through sluice, particularly for dosing a particulate material, comprising a supply chute (2) adapted to feed the particulate material and therebelow a cellular wheel (4) that is provided with radial cellular wheel webs (3) on a cellular wheel core (9) and that is arranged to rotate about a horizontal axis in a housing, which housing has a blow-in hole (10) and a blow-out hole (11) arranged in the housing below the horizontal axis of the cellular wheel within a rotational area of the cellular wheel webs (3) and positioned opposite each other in vertical side walls of the housing, characterized in that an injector nozzle (15) is integrated in the area of the blow-in hole (10), wherein said injector nozzle has an internal nozzle passage that converges to a throat and diverges from said throat to a nozzle outlet opening at an end of said injector nozzle arranged at said blow-in hole, and wherein said injector nozzle is adapted to blow transport air successively into plural dosing chambers (5) respectively formed between successive neighboring ones of the cellular wheel webs (3) while causing a reduced pressure of said transport air around said blow-in hole successively in each said dosing chamber, and in that the cellular wheel webs (3) are provided with gap seals (12) that are made of a material as hard as a metal and are positioned at radial outer ends of the cellular wheel webs with a radial spacing gap between each one of the gap seals and a cylindrical wall of the housing around the cellular wheel, wherein radially outer edges of the gap seals are configured as respective shear-cutting edges that are oriented facing circumferentially forward in a rotation direction of the cellular wheel, and further comprising a counter-cutting member with a counter-cutting edge arranged in the supply chute at a chute-bounding side wall thereof that is circumferentially downstream with respect to the rotation direction of the cellular wheel, wherein the counter-cutting edge is positioned relative to the shear-cutting edges and oriented circumferentially opposite the shear-cutting edges so as to cooperate with the shear-cutting edges to shear-cut particles of the particulate material between the counter-cutting edge and the shear-cutting edges, and wherein said injector nozzle is adapted to cause said reduced pressure of said transport air around said blow-in hole so as to reduce an amount of leakage of said transport air through said radial spacing gaps past said gap seals.

10. The cellular wheel sluice of claim 9, characterized in that the injector nozzle (15) is set-in coaxially and inwardly in a blow-in pipe socket (16) secured to the blow-in hole (10), said injector nozzle causing a reduction of the blow-in cross-section in the area of the blow-in hole (10) relative to the blow-in pipe cross-section.

11. The cellular wheel sluice of claim 9, characterized in that the blow-in hole (10) and the blow-out hole (11) are positioned axially opposite each other in the vertical side walls of the housing, and in that a cross-sectional area of the blow-out hole (11) has about the cross-section of one of the dosing chambers (5).

12. The cellular wheel sluice of claim 9, characterized in that the injector nozzle (15) is constructed as a pipe shape and said nozzle outlet opening has a diameter corresponding, at the most, to one half of the median diameter of one of the dosing chambers.

13. The cellular wheel sluice of claim 9, characterized in that the gap seals with the shear-cutting edges are constructed as separate components that are made of a spring steel or other low wear steel alloy and that are exchangeably secured to the cellular wheel webs (3).

14. The cellular wheel sluice of claim 9, characterized in that the counter-cutting member is a counter-cutting blade arranged in the supply chute (2) parallel to the shear-cutting edges (12) which rotatingly pass by the counter-cutting edge in an opposing alignment.

15. The cellular wheel sluice of claim 9, characterized in that the housing (1) is provided with a wear bushing (21) on the cylindrical wall and is provided with a wear lining (14) on inner surfaces of the vertical side walls, and in that the wear bushing and the wear lining are made of a spring steel material or a low wear steel alloy.

16. The cellular wheel sluice of claim 9, characterized in that the cellular wheel webs (3) are secured to the cellular wheel core (9) so that the shear-cutting edges (12) extend at a circumferentially skewed slant to the horizontal axis or with a slight helical shape about the horizontal axis.

17. The cellular wheel sluice of claim 9, characterized in that the counter-cutting edge is arranged at a circumferentially skewed slant to the horizontal axis and the cellular wheel webs are straight and parallel to the horizontal axis.

18. The cellular wheel sluice of claim 9, wherein said radial spacing gap has a radial measure from 0.2 mm to 0.5 mm.

19. The cellular wheel sluice of claim 9, wherein each one of the dosing chambers has a substantially trapezoidal, annular sector cross-sectional shape, and the blow-out hole has a substantially trapezoidal, annular sector opening shape.

20. The cellular wheel sluice of claim 19, wherein the opening shape of the blow-out hole has an area that approximately corresponds to an area of the cross-sectional shape of a respective one of the dosing chambers.

* * * * *